Figure 1:
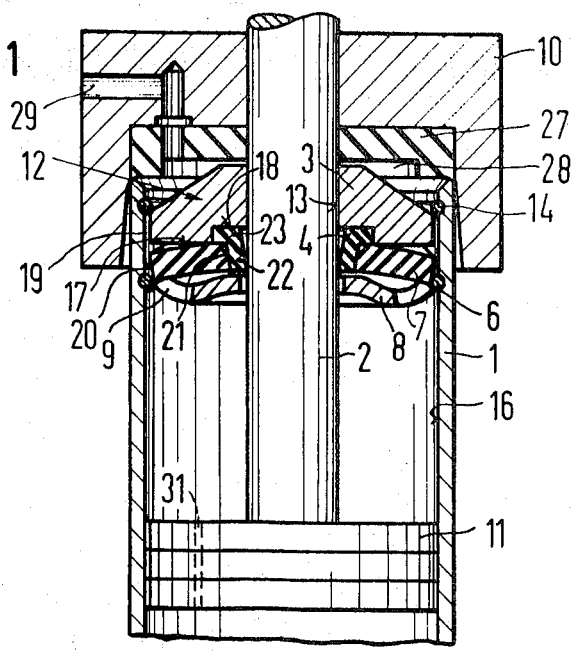

United States Patent [19]
Koller

[11] 3,788,630
[45] Jan. 29, 1974

[54] PNEUMATIC SUSPENSION UNIT
[75] Inventor: Manfred Koller, Schweinfurt am Main, Germany
[73] Assignee: Fichtel & Sachs AG, Schweinfurt am Main, Germany
[22] Filed: Apr. 12, 1971
[21] Appl. No.: 133,200

[30] Foreign Application Priority Data
Apr. 29, 1970 Germany............... P 20 20 964.7

[52] U.S. Cl. .............................. 267/65 R, 308/3.5
[51] Int. Cl. ............................................. F16f 9/36
[58] Field of Search .......... 267/129, 64, 65; 308/3.5

[56] References Cited
UNITED STATES PATENTS
2,992,864  7/1961  De Carbon .................... 308/3.5
3,139,159  6/1964  Lob .................................. 267/64
3,287,008  11/1966  Fernandez ..................... 267/129

Primary Examiner—James B. Marbert

[57] ABSTRACT

In a pneumatic suspension unit of the piston-and-cylinder type, the piston rod is guided into and out of the cylinder cavity by an annular guide member arranged in one axial end portion of the cavity. The outer circumference of the guide member defines a gap with the inner cylinder wall. A resilient sealing element having two radially extending faces is held in axial engagement of one face thereof with a corresponding face of the guide member by an annular backing member which engages the other face of the sealing element. Radially and axially open recesses in the backing member permit resilient deformation of the sealing element out of the normal relaxed position in which the sealing element engages the piston rod with its inner circumference and the inner cylinder wall with its entire outer circumference. Fluid forced into the gap between the guide member and the cylinder wall under sufficient pressure deflects portions of the sealing element into the recesses of the backing member so that fluid may enter the cylinder cavity.

9 Claims, 3 Drawing Figures

PNEUMATIC SUSPENSION UNIT

This invention relates to suspension units of a type commonly interposed between the sprung and unsprung masses of a motor vehicle and having a cylinder, a piston, a piston rod, and fluid, which is at least partly gaseous, filling the cylinder cavity under a pressure much higher than atmospheric pressure. More specifically, this invention is concerned with a sealing arrangement which prevents excape of gas from the cylinder cavity between the piston rod and the cylinder wall, yet permits the assembled unit to be charged with gas or other fluid under pressure through the sealing arrangement.

A known annular sealing assembly permits a unit of the type described to be initially charged with fluid under pressure through the assembly, but the fluid charge cannot be replenished later. Known suspension units capable of being supplied with supplemental fluid while under internal pressure do not admit the replenishing fluid through the seal for the piston rod, but are equipped with other devices for the purpose.

The object of the invention is the provision of a suspension unit of the piston-and-cylinder type in which a sealing arrangement for the piston rod provides not only a path for an initial fluid charge to be forced into the cylinder cavity, but also permits this charge to be supplemented later while its pressure is still well above ambient atmospheric pressure of approximately 14 – 15 p.s.i.

With this object and others in view, as will hereinafter become apparent, the invention provides an annular guide member in one axial end portion of the cylinder cavity. The guide member has a central bore which slidably receives the piston rod for guiding the same. The outer circumference of the guide member defines a gap in the cavity with the cylinder for axial passage of fluid therebetween. The guide member is secured against axial movement outward of the cavity.

A yieldably resilient sealing element has one radially extending face which axially engages a corresponding face of the guide member directed inward of the cylinder cavity. When the sealing element is in the relaxed condition, it sealingly engages the piston rod and the cylinder and thereby prevents passage of fluid from the afore-mentioned gap inward of the cavity. Another radially extending face of the sealing element, opposite to the first-mentioned face thereof, is engaged by an annular backing member secured against movement inward of the cavity from a position in which it limits axial movement of the sealing element away from the engaged face of the guide member. One or more recesses in the backing member are open in a radially outward direction and in an axial direction, and are of sufficient cross sectional size in a plane at right angles to the cylinder axis to receive a peripheral portion of the sealing element and to thereby open a gap between the sealing element and the cylinder for passage of fluid inward of the cylinder cavity when the sealing element is deformed by inward fluid pressure.

Figure 2:
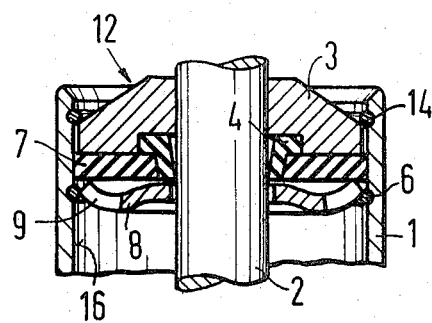
Figure 3:
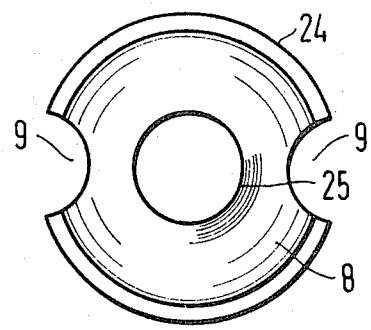

Other features and many of the attendant advantages of this invention will readily become apparent as the invention becomes better understood by reference to the following detailed description of a preferred embodiment when considered in connection with the accompanying drawing in which:

FIG. 1. is a fragmentary view of a suspension unit of the invention and of a connected charging device in elevational section on the cylinder axis;

FIG. 2 shows a portion of the unit of FIG. 1 in its normal operating condition; and FIG. 3 shows a backing ring of the same unit in top plan view.

Referring now to the drawing in detail, and initially to FIG. 1, there is seen only as much of an otherwise conventional hydropneumatic suspension unit as is necessary for an understanding of this invention.

The unit includes a cylinder 1 in which a piston 11 is axially slidable in sealing engagement with the inner cylinder wall 16. A piston rod 2 coaxially attached to the piston 11 passes outward of the axially terminal portion of the cylinder cavity, shown in FIG. 1, through an annular sealing assembly 12 with which this invention is more specifically concerned. The non-illustrated other axial end of the cylinder 1 may be sealed, or other provisions may be made for confining a fixed amount of fluid in the cylinder cavity during axial movement of the piston 11 with the piston rod 2.

As shown in its operative condition in FIG. 2, the sealing assembly 12 consists mainly of a partly frustoconical, annular guide plug 3, a resilient sealing element constituted by an annular disc 7 and a sealing ring 4 set into a central opening of the disc 7, and of a backing ring 8 which holds the sealing element 7, 4 in axial engagement with the plug 3. The entire assembly 12 is held in its axial position by snap rings 6, 14 partly received in circumferential grooves of semicircular cross section in the inner cylinder wall 16, and partly projecting into the cylinder cavity. The snap ring 14 prevents axial movement of the plug 3 outward of the cylinder cavity, and the snap ring 6 prevents inward movement of the backing ring 8.

The plug 3 is partly cylindrical, and the circumferential face of the cylindrical plug portion and the inner cylinder wall 16 radially bound a narrow annular gap 19 (FIG. 1) which permits axial flow of fluid past the plug 3. In the relaxed position of the sealing element 7, 4 shown in FIG. 2, the disc 7 closes the axially inner end of the gap 19.

The backing ring 8 is of undulating cross section. Its annular peripheral portion near the outer circumference 24 (FIG. 3) and its annular central portion near the inner circumference 25 are located approximately in a common plane perpendicular to the cylinder axis. The intermediate annular portion is offset toward the interior of the cylinder cavity and is of arcuate contour in the section through the cylinder axis seen in FIGS. 1 and 2. Two recesses or notches 9 are formed diametrically opposite each other in the peripheral portion of the backing ring 8. They are each open axially and in a radially outward direction and bounded by a concavely arcuate and approximately semicircular wall of the ring 8. The circumferential length of each recess 9 is approximately 45°.

The piston rod 2 is freely slidably received in the central bore 13 (FIG. 1) of the guide plug 3, the bore 13 being of sufficient length to guide the piston rod 2 in a precisely axial path in cooperation with the piston 11 to which the inner end of the piston rod is fixedly fastened. The radial face 17 of the plug 3 which is directed inward of the cylinder cavity is formed with an annular recess 18 about the orifice of the bore 13.

The sealing ring 4 has a conically tubular sleeve portion 22 which conformingly engages an inner circumferential wall 21 of the disc 7 in the central opening of the latter. An integral flange portion 23 at the wider base of the sleeve portion 22 is axially offset from the central opening in the disc 7 and conformingly received in the recess 18. The smaller base of the sleeve portion 22 engages the cylindrical piston rod 2 over an axially very narrow area so as not to interfere with the axial piston rod movement.

The outer circumferential wall 20 of the disc 7 sealingly engages the inner wall 16 of the cylinder in an arc of 360° in the relaxed condition of the disc illustrated in FIG. 2. FIG. 1 shows the unit while it is being charged with a compressed gas such as air or nitrogen through a passage partly bounded by the plug 3 and including the gap 19. The disc 7 constitutes a valve which seals the passage in the condition illustrated in FIG. 2 while responding to the pressure of the gas in the gap 19 for opening the passage under the conditions illustrated in FIG. 1.

A charging head 10 having the approximate shape of an inverted cup having a centrally perforated bottom is provided with a similarly perforated, dish-shaped rubber liner 27. The outer end portion of the piston rod 3, only partly seen in FIG. 1, passes through the aligned openings in the liner 27 and the charging head 10 in conforming sealing engagement with the liner 27. The rim of the liner 27 rests on the rim of the cylinder 1 so that an annular chamber 28 is axially bounded by the plug 3 and the liner 27. A passage 29 through the head 10 and the liner 27 connects the chamber 28 with a non-illustrated compressed-gas line.

The charging head 10 is fastened to the cylinder 1 by clamps, not shown, so that the gas pressure in the chamber 28 is transmitted through the gap 19 to the outer circumferential portion of the sealing disc 7. Where the disc is backed by the ring 8 over twice approximately 135° of its circumference, its outer circumference maintains sealing contact with the inner cylinder wall 16. The gas pressure, however, deforms those portions of the disc 7 which are axially aligned with the recesses or notches 9. As is seen in FIG. 1, two opposite circumferential portions of the disc 7 are pivoted inward of the cylinder cavity by the gas pressure and open gaps along the cylinder wall through which compressed gas can flow from the chamber 28 into the cylinder. When the charging head 10 is lifted from the cylinder 1, the chamber 28 is opened to the atmosphere, and the internal gas pressure in the cylinder cavity returns the sealing disc 7 to the position seen in FIG. 2 without significant gas loss.

The unitary charging head 10 shown in FIG. 1 permits the initial gas charge to be introduced into the illustrated suspension unit, or the existing charge to be replenished to compensate for leakage losses or to adapt the unit to a heavier load. The cylinder cavity may be filled with gas only or it may be filled partly with gas and partly with liquid in a manner well known in itself. The flow resistance of an axial throttling passage 31 in the piston 11 to the flow of fluid, particularly a liquid, provides a shock damping effect superimposed on the pneumatic spring effect of the confined body of gas, as is well known in itself.

Fewer or more notches 9 than are shown in the drawing may be provided in the backing ring 8 to suit specific operating conditions and specific materials of the disc 7. The illustrated arcuate and approximately semi-circular shape of the wall bounding the recess and the annular trough in the portion of the backing ring 8 intermediate the circumferential portions 24, 25 have been found to contribute materially to the useful life of the disc. The snap rings 6, 14 are located, and the axial dimensions of the plug 3, the disc 7, and the ring 8 are selected, in such a manner that a major portion of the outer circumference of the disc 7 is fixedly clamped between the ring 8 and the radial face 17 of the plug 3 in all operating conditions, the plug 3 and the ring 8 engaging respective radial faces of the flat disc 7.

The gap 19 is shown in the drawing to be of uniform radial width, the guide plug 3 being centered in the cylinder 1 by engagement of the snap ring 6 with the conical face of the plug. It is not necessary, however, that the gap 19 extend over the entire circumference of the plug 3, and the plug 3 may be centered otherwise than as explicitly shown.

It should be understood, therefore, that the foregoing disclosure relates merely to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In a suspension unit including a cylinder member having an axis and formed with a cavity therein; a piston member axially movable in said cavity; a piston rod member having an inner end portion secured to said piston member for movement therewith and an outer end portion outside said cavity; and sealing means for sealing said cavity and for confining a fixed amount of fluid in said cavity during said movement of the piston member, the improvement in the sealing means which comprises:

a. an annular guide member arranged in one axial end portion of said cavity, said guide member having
        1. a central bore slidably receiving said piston rod member for guiding the same,
        2. an outer circumference defining a first gap in said cavity with said cylinder member for axial passage of fluid therebetween, and
        3. a radially extending face directed inward of said cavity;
    b. first securing means securing said guide member against axial movement outward of said cavity;
    c. a yieldably resilient sealing element having two opposite, radially extending faces,
        1. one face of said element axially engaging said face of said guide member,
        2. said element when in the relaxed condition sealingly engaging said piston rod member and said cylinder member and thereby preventing passage of fluid from said gap inward of said cavity;
    d. an annular backing member engaging the outer face of said element; and
    e. second securing means securing said backing member against movement inward of said cavity from a position in which said backing member limits axial movement of said element away from said face of the guide member,
        1. said backing member being formed with at least one recess open in an axial direction and in a radially outward direction and of sufficient cross sectional size in a plane at right angles to said axis to receive a peripheral portion of said element and to thereby open a second gap between said element and said cylinder for passage of said fluid inward of said cavity when said element is deformed by inward axial pressure of said fluid.

2. In a unit as set forth in claim 1, said backing member when secured in said position thereof by said second securing means holding at least a peripheral portion of said element in axial engagement with said face of the guide member.

3. In a unit as set forth in claim 1, said backing member being formed with a second recess open in a radially outward direction opposite to said first-mentioned radially outward direction and of sufficient cross sectional size in said plane to receive another peripheral portion of said element when the same is deformed by said inward axial pressure.

4. In a unit as set forth in claim 8, said recess having a wall of concavely arcuate contour in said plane.

5. In a unit as set forth in claim 4, said contour being approximately semi-circular.

6. In a unit as set forth in claim 1, at least one of said securing means including a snap ring partly received in a circumferential groove of said cylinder member and partly projecting into said cavity.

7. A method of charging the cavity of a unit as defined in claim 8 with a fluid under pressure greater than atmospheric pressure which comprises:
   a. sealing a charging head to said cylinder member and to said outer end portion of said piston rod member adjacent said axial end portion of said cavity so as to define an annular chamber about said piston rod, the chamber being axially bounded by said guide member and said charging head; and
   b. forcing said fluid through a passage in said head into said chamber at a pressure sufficient to deform said element and to thereby open a gap between said element and said cylinder member for entry of the fluid into said cavity.

8. In a unit as set forth in claim 1, said cylinder member having an inner wall cylindrical about said axis, said wall bounding said cavity, said piston member slidably engaging said wall during axial movement in said cavity, said outer circumference of said guide member defining said first gap with said wall, said sealing element in said relaxed condition thereof sealingly engaging said wall, said at least one recess being open toward said wall, and said second gap being formed between said sealing element and said wall.

9. In a suspension unit including a cylinder member having an axis and formed with a cavity therein; a piston member axially movable in said cavity; a piston rod member having an inner end portion secured to said piston member for movement therewith and an outer end portion outside said cavity; and sealing means for sealing said cavity and for confining a fixed amount of fluid in said cavity during said movement of the piston member, the improvement in the sealing means which comprises:

I. bounding means bounding a passage for axial flow of fluid from outside said cylinder into said cavity, said bounding means including
   a. an annular guide member arranged in one axial end portion of said cavity, said guide member having
      1. a central bore slidably receiving said piston rod member for guiding the same,
      2. an outer circumference defining a first gap in said cavity with said cylinder member for axial passage of said fluid therebetween, and
      3. a radially extending face directed inward of said cavity;
   b. first securing means securing said guide member against axial movement outward of said cavity; and II. valve means normally sealing said passage, and responsive to fluid pressure in said first gap greater than the fluid pressure in said cavity for opening said passage, said valve means including
   c. a yieldably resilient sealing element having two opposite, radially extending faces,
      1. one face of said element axially engaging said face of said guide member,
      2. said element when in the relaxed condition sealingly engaging said piston rod member and said cylinder member and thereby preventing passage of fluid from said gap inward of said cavity;
   d. an annular backing member engaging the outer face of said element; and
   e. second securing means securing said backing member against movement inward of said cavity from a position in which said backing member limits axial movement of said element away from said face of the guide member,
      1. said backing member being formed with at least one recess open in an axial direction and in a radially outward direction and of sufficient cross sectional size in a plane at right angles to said axis to receive a peripheral portion of said element and to thereby open a second gap between said element and said cylinder for passage of said fluid inward of said cavity when said element is deformed by inward axial pressure of said fluid in said first gap.

* * * * *